United States Patent
Pacher et al.

(10) Patent No.: US 6,837,470 B2
(45) Date of Patent: Jan. 4, 2005

(54) HOLDER FOR A BEVERAGE CONTAINER

(75) Inventors: Thomas Pacher, Dornstetten (DE); Ulf-Lothar Bastian, Waldachtal (DE); Rolf Schaeuffele, Eutingen (DE); Wolf-Dieter Benz, Schopfloch (DE)

(73) Assignee: Fischer Automotive Systems GmbH, Horb (DE)

( * ) Notice: Subject to any disclaimer, the term of this patent is extended or adjusted under 35 U.S.C. 154(b) by 0 days.

(21) Appl. No.: 10/431,098

(22) Filed: May 7, 2003

(65) Prior Publication Data

US 2003/0226945 A1 Dec. 11, 2003

(30) Foreign Application Priority Data

Jun. 6, 2002 (DE) .......................................... 102 25 068

(51) Int. Cl.[7] .............................................. A47K 1/08
(52) U.S. Cl. .................................. 248/311.2; 248/316.5
(58) Field of Search ............................ 248/311.2, 313, 248/316.3, 316.5, 316.7, 312, 312.1, 535, 540, 541

(56) References Cited

U.S. PATENT DOCUMENTS

| | | | | |
|---|---|---|---|---|
| 5,141,194 A | * | 8/1992 | Burgess et al. | 248/311.2 |
| 5,379,978 A | * | 1/1995 | Patel et al. | 248/311.2 |
| 5,505,417 A | * | 4/1996 | Plocher | 248/311.2 |
| 5,673,891 A | * | 10/1997 | Fujihara et al. | 248/311.2 |
| 5,845,888 A | * | 12/1998 | Anderson | 248/311.2 |
| 5,899,426 A | * | 5/1999 | Gross et al. | 248/311.2 |
| 6,349,913 B1 | * | 2/2002 | Jankowski | 248/311.2 |
| 6,427,960 B1 | * | 8/2002 | Gehring et al. | 248/311.2 |
| 6,464,187 B1 | * | 10/2002 | Bieck et al. | 248/311.2 |
| 6,550,736 B2 | * | 4/2003 | Schaal | 248/311.2 |
| 6,685,152 B2 | * | 2/2004 | Shirase et al. | 248/311.2 |

FOREIGN PATENT DOCUMENTS

| | | |
|---|---|---|
| DE | 195 19 602 C1 | 9/1996 |
| DE | 296 06 583 U1 | 11/1997 |
| DE | 199 26 003 A1 | 12/2000 |

OTHER PUBLICATIONS

Patent Abstracts of Japan 06072224 A, May 15, 1994.
Patent Abstracts of Japan 2000016139 A, Jan. 18, 2000.

* cited by examiner

*Primary Examiner*—Leslie A. Braun
*Assistant Examiner*—A. Joseph Wujciak
(74) *Attorney, Agent, or Firm*—Michael J. Striker

(57) ABSTRACT

A holder for beverage containers has a container receptacle for a beverage container, a clamping device provided in the container receptacle, the clamping device including at least one semi-circular retaining clip which is mounted in an upper region of the container receptacle, two radially opposite hinges mounting the at least one semi-circular retaining clip in the upper region of the container receptacle on a circumference so that the at least one semi-circular retaining clip is mounted resiliently and pivotally, the at least one semi-circular retaining clip pivoting out of the container receptacle by a spring action opposite to an insertion direction of a beverage container, and stop members limiting a pivoting angle in both directions.

5 Claims, 2 Drawing Sheets

US 6,837,470 B2

HOLDER FOR A BEVERAGE CONTAINER

BACKGROUND OF THE INVENTION

The present invention relates to holders for beverage containers.

More particularly, it relates to holders for beverage containers which have a cup-shaped receptacle.

Holders having a cup-shaped container receptacle for cups, beakers, beverage cans, bottles or the like are known from the prior art. The known holders have at least one or several holding jaws or the like arranged distributed in part around the circumference. These project into the interior of the cup-shaped container receptacle and have sloping and/or rounded sliding contact surfaces. By virtue of a spring system, the holding jaws can be pressed radially away by the circumferential surface of a beverage container and provide support for the beverage container by clamping. Such a holder is known, for example, from German patent document DE 296 06 583.8. The corresponding clamping device has holding jaws, each of which are individually fixed with a pivoting and linear bearing to the beverage container holder. As the spring element, a resilient circular ring or a band is proposed, which engages around the container receptacle. Such holders have the drawback that sometimes they do not provide enough support for tall beverage containers, such as bottles for example, since clamping is applied only in the lower region of the beverage container. Furthermore, clamping of waisted bottles is usually not possible. Either the holding jaws are applied just above the waist and push the beverage container upwards, or the holding jaws are applied above the largest diameter, resulting in unduly strong clamping.

German patent document DE 199 26 003.6, for example, discloses holding devices that have a sliding guide system, in which a slide is slidably guided in the manner of a drawer from an inserted into a pulled-out position. All elements of the holder, especially the container receptacle and the clamping device, are pivoted and tilted in the inserted position relative to the pulled-out position in such a manner that they can be guided into the shallow installation space of the drawer. Correspondingly, the elements are distinctly simpler compared with the above-described holders. In the pulled-out state, a beverage container can be placed on the slide and is clamped merely by a downwardly pivotable compensating flap. Clamping of this kind has the same problems as the previously described clamping devices.

SUMMARY OF THE INVENTION

Accordingly, it is an object of the present invention to provide a holder for beverage containers, which avoids the disadvantages of the prior art.

More particularly, it is an object of the present invention to provide a holder for beverage containers, which in particular provides a secure support also for tail and waisted beverage containers and is suitable for drawer-like holding devices.

In keeping with these objects and with others which will become apparent hereinafter, one feature of the present invention resides, briefly stated, in a holder for beverage containers which is formed so that a beverage container can be clamped above the container receptacle by at least one semi-circular retaining clip. The retaining clip is mounted in the upper region of the container receptacle at two radially opposite hinges of the circumference, so that the pivoting axis runs perpendicularly to the axis of symmetry of the container receptacle. A spring applies a torque to the retaining clip, the torque causes the retaining clip to pivot out of the container receptacle. The pivoting angle is limited in both directions by stop members.

Limitation of the one pivoting angle is selected so that the plane described by the retaining clip is perpendicular to the axis of symmetry of the container receptacle. In that position, the retaining clip lies flat against the circumference of the container receptacle. Limitation of the other pivoting angle is selected so that in a pivoted position, in which it projects from the container receptacle, the retaining clip stands upright, that is, is pivoted between, for example, 45° and 90° relative to the first mentioned stop member.

To insert a beverage container, it is guided from above and/or from the side towards the retaining clip, and the retaining clip is pivoted against the described spring action at least until the beverage container can be introduced into the container receptacle. The container is introduced until it rests on the base of the container receptacle. In this position, it is clamped by the retaining clip at a point-form or line-form clamping location above the container receptacle. The effect of clamping above the container receptacle is that a bending moment acts on the beverage container, this bending moment being absorbed inside the container receptacle at at least two opposite points as counter abutments. For this purpose, for example, a depression can additionally be stamped into the base.

According to the invention the holder clamps a beverage container above the container receptacle, which for tall and/or waisted beverage containers leads to a more favourable clamping effect compared with the known clamping devices.

In a preferred embodiment of the invention, the holder comprises two semi-circular retaining clips, the radii of the retaining clips being different and the hinges being arranged offset at the circumference. The effect of the different radii is that the retaining clips do not obstruct one another. By providing two retaining clips, the beverage container is clamped at two clamping points above the container receptacle, thus providing a distinctly greater security against tilting compared with just one retaining clip. The hinges are preferably offset through 90° with respect to one another.

When the holder is a drawer-like holding device for beverage containers, the retaining clips have to be pivoted against the spring action on insertion into the drawer, so that they lie flat against the container receptacle. The container receptacle is in this case formed by a retaining ring and the slide as a base. At the same time, the slide can also serve as a drip tray, although alternatively in its place a separate clip can be provided, which supports the beverage container underneath and as the slide is inserted is pivoted into a flat position adapted to the installation space of the drawer.

The retaining ring is also fastened by means of a hinge to the slide and as the drawer is inserted is pivoted by a U-shaped control element from a raised position into a lowered position. This pivoting movement is used to pivot the retaining clips as well. As the retaining ring is lowered, the downwardly pivoting free ends of the retaining clips come into contact with control pins, cams or the like that are mounted on the slide. This produces a torque opposing the spring action, whereby the retaining clips are pivoted into the flat position.

DESCRIPTION OF THE PREFERRED EMBODIMENTS

Figure 1:
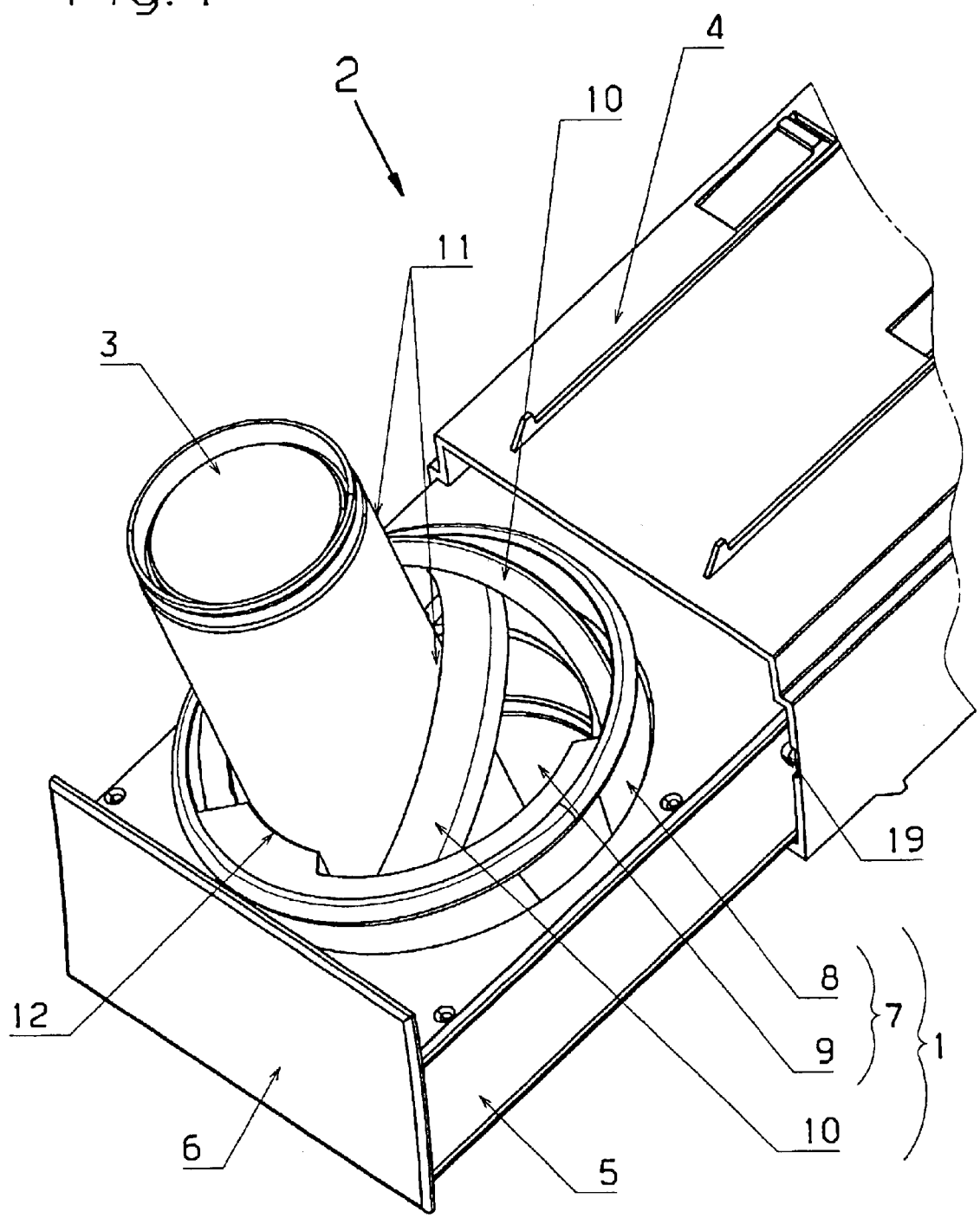
FIG. 1 is a perspective view of the holder in accordance with the present invention as part of a holding device.

A holder 1 illustrated in FIG. 1 is part of a drawer-like holding device 2 for building into a motor vehicle and can be used to hold beverage containers 3 such as, for example, cups, beakers, beverage cans, bottles or the like. The holding device 2 consists essentially of the housing 4 and the slide 5 with the front cover 6 and the holder 1. The housing 4 is intended, for example, for installation in the centre console region of a motor vehicle. The slide 5 can be moved into and out of the housing 4 by operating the front cover 6. For example, a push-push catch (not shown) an be used for locking and release.

The holder 1 is integrated in the slide 5. It consists of a container receptacle 7, which is formed by a retaining ring 8 and the base 9 of the slide 5, and of the two semi-circular retaining clips 10, in the extended position of the slide 5 shown, relative to the slide 5 the retaining ring 8 is raised and slightly pivoted. In the upper region of the retaining ring, the retaining clips 10 are each fastened offset through 90° at two radially opposite hinges 14 (see FIG. 2). They have different radii and are pivoted by spring action out of the retaining ring 8 so that they clamp the beverage container 3 at the clamping points 11.

The stop member 12 of the retaining ring 8 and the base 9 of the slide 5 serve as abutments. This type of clamping offers a very good support, especially for tall and/or waisted beverage containers 3.

If no beverage container 3 is inserted in the holder 1, the retaining clips 10 are pivoted through a further 5 to 10° relative to the retaining ring 8. To insert a beverage container 3, this is guided from the front and/or from above towards the retaining clips 10. "From the front" means the direction of insertion of the slide. "From above" means the direction perpendicular to the plane of the retaining ring 8 towards the base 9. The retaining clips 10 are pivoted against the spring action until the beverage container 3 can be introduced into the retaining ring 8. It is inserted until it rests on the base 9 of the slide 5.

Figure 2:
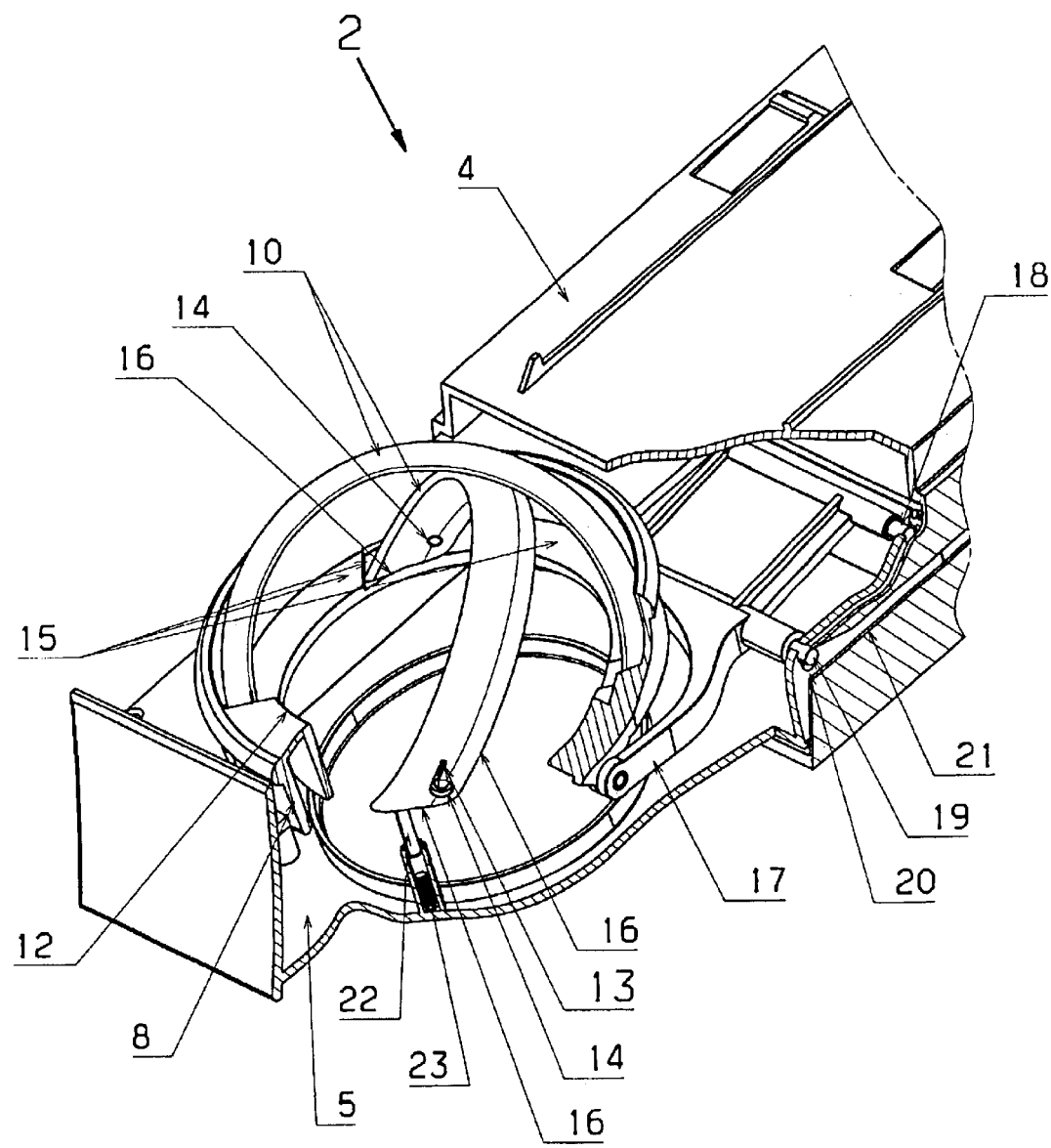
FIG. 2 is a perspective sectional view of the holding device in accordance with the present invention.

FIG. 2 shows in section the essential function elements of the holding device 2. The spring action of the retaining clips 10 is achieved by torsion springs 13 at at least one hinge 14 of the respective retaining clip 10. Several lugs 15 in the retaining ring 8, as well as the stop edges 16 of the retaining clips 10, are used as stop members for the pivoting of the retaining clips 10. For inward pivoting and lowering of the retaining ring 8 into the installation space of the slide 5, the retaining ring 8 is guided by the hinge-mounted, U-shaped control member 17.

The U-shaped control member 17 is pivotally mounted in the slide 5 by way of a bearing pin 18. The pivoting movement is achieved by the control pin 19, which projects through the slot 20 in the slide 5 and is guided by the guide groove 21 in the housing 4. By lowering the retaining ring 8 into the slide 5, a torque opposed to the torsion spring 13 is exerted via the control pin 22 on the retaining clip 10. The control pin 22 is guided by a bushing mounted on the slide 5. The transfer of force between the control pin 22 and the slide 5, which is stationary relative to the retaining ring 8, is effected via the spring 23, so that, irrespective of manufacturing tolerances, pivoting of the retaining clip 10 until it engages with the lug 15 is ensured.

Both retaining clips 10 are pivoted in this manner into the retaining ring 8 and this in turn is pivoted into the installation space of the slide 5, so that all elements of the holder 1 can be pushed into the shall space of the housing 4. On ejection, the described movements are performed in reverse order.

It will be understood that each of the elements described above, or two or more together, may also find a useful application in other types of constructions differing from the types described above.

While the invention has been illustrated and described as embodied in holder for a beverage container, it is not intended to be limited to the details shown, since various modifications and structural changes may be made without departing in anyway from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A holder for beverage containers, comprising a container receptacle for a beverage container; a clamping device provided in said container receptacle, said clamping device including at least one first semi-circular retaining clip which is mounted in an upper region of said container receptacle; two radially opposite hinges mounting said at least one semi-circular retaining clip in said upper region of said container receptacle on a circumference so that said at least one semi-circular retaining clip is mounted resiliently and pivotally, said at least one semi-circular retaining clip pivoting out of said container receptacle by a spring action opposite to an insertion direction of a beverage container; and stop members limiting a pivoting angle in both directions, said holder further comprising a second such semi-circular retaining clip, said at least one retaining clip and said second retaining clip having radii which are different, and said hinges being arranged offset at a circumference of said container receptacle.

2. A holder for beverage containers as define in claim 1; and further comprising a holding device for a beverage container, said holding device including a slide which is slideably guided in a manner of a drawer from an inserted position into a pulled-out position, said container receptacle being formed in said pulled-out position by a retaining ring and a base, into which the beverage container is placeable.

3. A holder for beverage containers as defined in claim 2; and further comprising a U-shaped control member which guides said retaining ring during ejection from a lowered position into a raised position; and means for pivoting said at least one first and said second retaining clips, during insertion of said slide, into said retaining ring, said means being supported on said slide.

4. A holder for beverage containers as defined in claim 3, wherein said means for pivoting said at least one first and said second retaining clips include control pins.

5. A holder for beverage containers, comprising a container receptacle for a beverage container; a clamping device provided in said container receptacle, said clamping device including at least one first semi-circular retaining clip which is mounted in an upper region of said container receptacle; two radially opposite hinges mounting said at least one semi-circular retaining clip in said upper region of said container receptacle on a circumference so that said at least one semi-circular retaining clip is mounted resiliently and pivotally, said at least one semi-circular retaining clip pivoting out of said container receptacle by a spring action opposite to an insertion direction of a beverage container; and stop members limiting a pivoting angle in both directions, said holder further comprising a second such semi-circular retaining clip, said at least one retaining clip and said second retaining clip having radii which are different, and said hinges being arranged offset at a circumference of said container receptacle, and wherein said hinges are mounted offset through 90° at the circumference of said container receptacle.

* * * * *